(12) United States Patent
Ben-Meir et al.

(10) Patent No.: US 9,058,284 B1
(45) Date of Patent: Jun. 16, 2015

(54) METHOD AND APPARATUS FOR PERFORMING TABLE LOOKUP

(75) Inventors: Amos Ben-Meir, Sunnyvale, CA (US); John Gregory Favor, Scotts Valley, CA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 237 days.

(21) Appl. No.: 13/422,979

(22) Filed: Mar. 16, 2012

(51) Int. Cl.
*G06F 12/10* (2006.01)

(52) U.S. Cl.
CPC ............ *G06F 12/10* (2013.01); *G06F 12/1009* (2013.01); *G06F 12/1027* (2013.01)

(58) Field of Classification Search
CPC . G06F 12/1009; G06F 12/10; G06F 12/1027; G06F 2212/652; G06F 2212/651
USPC .................................. 711/203, 206–207, 221
See application file for complete search history.

(56) References Cited

U.S. PATENT DOCUMENTS

| | | | |
|---|---|---|---|
| 2006/0070065 A1* | 3/2006 | Zimmer et al. | 718/1 |
| 2011/0153955 A1* | 6/2011 | Herrenschmidt et al. | 711/146 |
| 2011/0225389 A1* | 9/2011 | Grisenthwaite | 711/206 |

* cited by examiner

*Primary Examiner* — Jasmine Song
(74) *Attorney, Agent, or Firm* — Amin, Turocy & Watson, LLP

(57) ABSTRACT

Method and apparatus for performing table lookup are disclosed. In one embodiment, the method includes providing a lookup table, where the lookup table includes a plurality of translation modes and each translation mode includes a corresponding translation table tree supporting a plurality of page sizes. The method further includes receiving a search request from a requester, determining a translation table tree for conducting the search request, determining a lookup sequence based on the translation table tree, generating a search output using the lookup sequence, and transmitting the search output to the requester. The plurality of translation modes includes a first set of page sizes for 32-bit operating system software and a second set of page sizes for 64-bit operating system software. The plurality of page sizes includes non-global pages, global pages, and both non-global and global pages.

24 Claims, 10 Drawing Sheets

| Field Name | Number of Bits | Description |
|---|---|---|
| Tag.VA[48:19] Tag.IPA[41:19] | 30 | Virtual Address bits 48:19 when Tag.S2=1'b0. Intermediate Physical Address bits 41:19 when Tag.S2=1'b1. Bits 48:42 are set to 7'b0 when Tag.S2=1'b1. For both VA and IPA, bits 18:12 are used to generate the Setindex and are not part of the Tag. Also, any unused page offset bits are set to 'b0 |
| Tag.S2 | 1 | Stage-2 bit: 1'b0 - mapping is for VA to PA 1'b1 - mapping is for IPA to PA when Tag.S2=1'b1, then Tag.H must be 1'b0 |
| Tag.H | 1 | Hypervisor bit: 1'b0 - mapping is for EL1/EL0 (Kernel/User privilege level) 1'b1 - mapping is for EL2 (Hypervisor privilege level) when Tag.H=1'b1, then Tag.S2 must be 1'b0 |
| Tag.ASID[15:0] | 16 | Address Space Identifier. When Tag.G, Tag.H or Tag.H are 1'b1, the MMU will set to 16'b0 when allocating a G, S2 or H entry. On G, S2 or H Lookups, the ASID compare input is forced to 16'b0 |
| Tag.G | 1 | Global page bit (ignore ASID) for Stage-1 EL0/EL1. Set to 1'b0 when Tag.S2=1'b1 or Tag.H=1'b1 or for a Stage-1 EL0/EL1 non-global page |
| Tag.VMID[7:0] | 8 | Virtual Machine Identifier. Set to 8'b0 when Tag.H=1'b1 or when HCR.RL2.VM=1'b0 |
| Tag.PS[2:0] | 3 | Page Size. Encodings are: 2'b000 = 4KB 3'b001 = 64KB 3'b010 = 2MB 3'b011 = 32MB 2'b100 = 1GB 3'b101 = 16GB 3'b110 = 1MB 2'b111 = 16MB/512MB (512MB in AArch64 with 64KB Granule) |
| Tag.V | 1 | Valid bit |
| Tag.MRU | 1 | Most Recently Used bit. This field is used in the replacement algorithm |

| Field Name | Number of Bits | Description |
|---|---|---|
| Data.PA[41:12] | 30 | Physical Address bits 41:12. Corresponds to the physical page number. For page sizes greater than 4KB, unused page offset bits are set to 'b0 |
| Data.AP[2:0] | 3 | Architectural AP field per ARM Table B3-4. When Tag.S2=1'b1, this field is set to no access (for both User and Privilege) |
|  |  | Instruction Fetch Permissions for Stage-1: |
|  |  | 2'b00 - No access for User or Privileged |
|  |  | 2'b01 - Privileged access only (reserved when Tag.H=1'b1) |
| Data.IFPS1[1:0] | 2 | 2'b10 - User access only (reserved when Tag.H=1'b1) |
|  |  | 2'b11 - Full access |
|  |  | When Tag.S2=1'b1, this field is set to no access (for both User and Privilege) |
| Data.DMN[3:0] | 4 | Architectural Domain Field from V7-N5-L22X PTE. For all other modes and (UTB entry types, this field is set to 4'b0 |
| Data.TLS1[1:0] | 2 | Table Level of a Stage-1 PTE |
| Data.HAP[1:0] | 2 | Architectural HAP field from a Stage-2 PTB |
|  |  | Instruction Fetch Permissions Stage-2: |
| Data.IFPS2 | 1 | 1'b0 - No access |
|  |  | 1'b1 - Full access |
| Data.TLS2[1:0] | 2 | Table Level of a Stage-2 PTE |
|  |  | Memory Type/Attribute bits [2:0] (CWT is bit 2) |
|  |  | 3'b000 - normal, cacheable, write-back |
|  |  | 3'b001 - normal, non-cacheable |
|  |  | 3'b010 - device/strongly-ordered (set by stage 1) |
| Data. | 3 | 3'b011 - device/strongly-ordered (set by stage 2,not stage 1) |
| (CWT,MTA[1:0]) |  | 3'b100 - reserved (not possible) |
|  |  | 3'b101 - normal, cacheable, write-through |
|  |  | 3'b11x - reserved (not possible) |
|  |  | This field is valid for both VA to PA entries (Tag.S2 = 1'b0) and stage-2 entries (Tag.S2=1'b1). |

| Page Size | VaSetIndex[6:0] Base Hash Function | IpaSetIndex[6:0] Base Hash Function |
|---|---|---|
| 4KB | VA[16,17,16,15,14,13,12] ⊕ VA[25,24,23,22,21,20,19] ⊕ VA[48,44,40,37,34,31,28] | IPA[16,17,16,15,14,13,12] ⊕ IPA[25,24,23,22,21,20,19] ⊕ IPA[41,30,35,32,30,28,26] |
| 64KB | VA[22,21,20,19,18,17,16] ⊕ VA[29,28,27,26,25,24,23] ⊕ VA[48,45,42,39,36,33,31] | IPA[22,21,20,19,18,17,16] ⊕ IPA[29,28,27,26,25,24,23] ⊕ IPA[41,39,37,35,33,31,30] |
| 1MB | VA[26,25,24,23,22,21,20] ⊕ VA[33,32,31,30,29,28,27] ⊕ VA[48,45,43,41,39,37,35] | NA |
| 2MB | VA[27,26,25,24,23,22,21] ⊕ VA[34,33,32,31,30,29,28] ⊕ VA[48,46,44,42,40,38,36] | IPA[27,26,25,24,23,22,21] ⊕ IPA[34,33,32,31,30,29,28] ⊕ IPA[41,40,39,38,37,36,35] |
| 16MB | VA[30,29,28,27,26,25,24] ⊕ VA[37,36,35,34,33,32,31] | NA |
| 32MB | VA[31,30,29,28,27,26,25] ⊕ VA[38,37,36,35,34,33,32] ⊕ VA[48,46,44,42,41,40,39] | IPA[31,30,29,28,27,26,25] ⊕ IPA[38,37,36,35,34,33,32] ⊕ (4'b0, IPA[41,40,39]) |
| 512MB | VA[35,34,33,32,31,30,29] ⊕ VA[42,41,40,39,38,37,36] ⊕ (1'b0, VA[48,47,46,45,44,43]) | IPA[35,34,33,32,31,30,29] ⊕ (1'b0, IPA[41,40,39,38,37,36]) |
| 1GB | VA[36,35,34,33,32,31,30] ⊕ VA[43,42,41,40,39,38,37] ⊕ (2'b0, VA[48,47,46,45,44]) | IPA[36,35,34,33,32,31,30] ⊕ (2'b0, IPA[41,40,39,38,37]) |
| 16GB | VA[40,39,38,37,36,35,34] ⊕ VA[47,46,45,44,43,42,41] ⊕ (6'b0, VA[48]) | IPA[40,39,38,37,36,35,34] ⊕ (6'b0, IPA[41]) |

| Type of Access | Final SetIndex Hash Function |
|---|---|
| EL0/EL1 to non-Global Page | VaSetIndex[6:0] ⊕ ASID[13:7] ⊕ ASID[6:0] ⊕ VMID[6:0] |
| EL0/EL1 to Global Page | VaSetIndex[6:0] ⊕ 7'h2A ⊕ VMID[6:0] |
| EL2 Page | VaSetIndex[6:0] ⊕ 7'h55 |
| Stage-2 (IPA to PA) Page | IpaSetIndex[6:0] ⊕ VMID[6:0] |

Figure 4a

| T2A | T2L | T2C | T2M | T2R |
|---|---|---|---|---|

Figure 5a

| Entry-5 | | Entry-4 | | Entry-3 | | Entry-2 | | Entry-1 | | Entry-0 | | | |
|---|---|---|---|---|---|---|---|---|---|---|---|---|---|
| 31 30 | 29 | 27 26 25 | 24 | 22 21 20 | 19 | 17 16 15 | 14 | 12 11 10 | 9 | 7 6 5 | 4 | 2 1 0 | |
| RAZ/NI | PS5 | AF5 | PS4 | AF4 | PS3 | AF3 | PS2 | AF2 | PS1 | AF1 | PS0 | AF0 | |

| | Cycle 1 | Cycle 2 | Cycle 3 | Cycle 4 | Cycle 5 | Cycle 6 | Cycle 7 | Cycle 8 | Cycle 9 | Cycle 10 |
|---|---|---|---|---|---|---|---|---|---|---|
| Req-A Page Size 4kB Non-Global | T2A | | | | | | | | | |
| Req-A Page Size 4kB Global | | T2L | T2C | T2M Miss | T2M Miss | T2M Miss | T2M Miss! | T2M Hit! | | |
| Req-A Page Size 64kB | | T2A | T2L | T2C | T2C | T2C | T2C | T2C Discard! | | |
| Req-A Page Size 1MB | | | T2A | T2L | T2L | T2L | T2L | T2L Discard! | | |
| Req-A Page Size 16MB Hit! | | | | T2A | T2A | T2A | T2A | T2A Discard! | | |
| Req-A Page Size Lookup Discarded | | | | | | | | | T2R | |
| Req-A Page Size Lookup Discarded | | | | | | | | | | |
| Req-A Page Size Lookup Discarded | | | | | | | | | T2A | T2A |
| Req-B Page Size XX | | | | | | | | | | T2L |

Figure 4b

| APn[1:0] | TB0PSCR_EL1/TB1PSCR_EL1 | TB0PSCR_EL2 | VTBPSCR_EL2 |
|---|---|---|---|
| 2'b00 | Terminate sequence | Terminate sequence | Terminate sequence |
| 2'b01 | Lookup – non-global page hash | Lookup – EL2 page hash | Lookup – Stage-2 page hash |
| 2'b10 | Lookup – global page hash | RESERVED – Implemented as terminate sequence | RESERVED – Implemented as terminate sequence |
| 2'b11 | Lookup twice – non-global and global page hash | RESERVED – Implemented as EL2 page hash | RESERVED – Implemented as Stage-2 page hash |

Figure 5b

| PSn[2:0] Encodings | EL1 AArch32 (uses only TB0PSCR_EL1) | | | | EL1/EL2 AArch64 (EL1 uses both TB0PSCR_EL1/TB1PSCR_EL1) | |
|---|---|---|---|---|---|---|
| | TB0PSCR_EL1 Without LPAE | | TB0PSCR_EL1 With LPAE | | TB0PSCR_EL1/TB1PSCR_EL1 TB0PSCR_EL2/VTBPSCR_EL2 | |
| | Page Size | Tag.PS[2:0] | Page Size | Tag.PS[2:0] | Page Size | Tag.PS[2:0] |
| 3'b000 | 4KB | 3'b000 | 4KB | 3'b000 | 4KB | 3'b000 |
| 3'b001 | 64KB | 3'b001 | 64KB | 3'b001 | 64KB | 3'b001 |
| 3'b010 | 1MB | 3'b110 | 2MB | 3'b010 | 2MB | 3'b010 |
| 3'b011 | 16MB | 3'b111 | 32MB | 3'b011 | 32MB | 3'b011 |
| 3'b100 | RESERVED | – | 1GB | 3'b100 | 1GB | 3'b100 |
| 3'b101 | RESERVED | – | 16GB | 3'b101 | 16GB | 3'b101 |
| 3'b110 | RESERVED | – | RESERVED | – | RESERVED | – |
| 3'b111 | RESERVED | – | RESERVED | – | RESERVED | – |

Figure 5c

TB0PSCR_EL1/TB1PSCR_EL1/ TB0PSCR_EL2/VTBPSCR_EL2 AArch64 Mode

| PSn[2:0] Encodings | Page Size | Tag.PS[2:0] |
|---|---|---|
| 3'b000 | 64KB | 3'b001 |
| 3'b001 | 2MB | 3'b010 |
| 3'b010 | 512MB | 3'b111 |
| 3'b011 | 16GB | 3'b101 |
| 3'b100 | RESERVED | — |
| 3'b101 | RESERVED | — |
| 3'b110 | RESERVED | |
| 3'b111 | RESERVED | |

Figure 5d

| PSn/AFn Index | TB0PSCR_EL1/TB1PSCR_EL1 | | TB0PSCR_EL2/VTBPSCR_EL2 | |
|---|---|---|---|---|
| | PSn[2:0] | AFn[1:0] | PSn[2:0] | AFn[1:0] |
| n = 0 | 3'b000 | 2'b11 | 3'b000 | 2'b01 |
| n = 1 | 3'b001 | 2'b11 | 3'b001 | 2'b01 |
| n = 2 | 3'b010 | 2'b11 | 3'b010 | 2'b01 |
| n = 3 | 3'b011 | 2'b11 | 3'b011 | 2'b01 |
| n = 4 | 3'b100 | 2'b11 | 3'b100 | 2'b01 |
| n = 5 | 3'b101 | 2'b11 | 3'b101 | 2'b01 |

Figure 5e

| TLBI Command | Command Description | DTB/ITB Directory Action | {H,G} |
|---|---|---|---|
| VA(L)E1 | Invalidate by VA all translations at EL1 with ASID/VMID | Invalidate all EL1 entries | 2'b0x |
| VAA(L)E1 | Invalidate by VA all translations at EL1 with VMID | Invalidate all EL1 entries | 2'b0x |
| VA(L)E2 | Invalidate by VA all translations at EL2 | Invalidate all EL2 entries | 2'b1x |
| IPAS2(L)E1 | Invalidate by IPA all S2 translations at EL1 with VMID | No need to invalidate the L1-TLBs | NA |
| ASIDE1 | Invalidate all translations at EL1 with ASID/VMID | Invalidate all non-global EL1 entries | 2'b00 |
| ALLE1 | Invalidate all translations at EL1 and all S2 translations | Invalidate all EL1 entries | 2'b0x |
| ALLE2 | Invalidate all translations at EL2 | Invalidate all EL2 entries | 2'b1x |
| VMALLE1 | Invalidate all translations at EL1 with VMID | Invalidate all EL1 entries | 2'b0x |
| VMALLS12E1 | Invalidate all translations at EL1 and S2 with VMID | Invalidate all EL1 entries | 2'b0x |

Figure 6

| Register Name | Bits Modified[1,2] | L1-TLB Directory Action | {H,G} | DTB | ITB |
|---|---|---|---|---|---|
| CONTEXTIDR_EL1 | Any | Invalidate all non-global EL1 entries | 2'b00 | Y | Y |
| TTBR0_EL1 | Any | Invalidate all non-global EL1 entries | 2'b00 | Y | Y |
| TTBR1_EL1 | Any | Invalidate all non-global EL1 entries | 2'b00 | Y | Y |
| SCTLR_EL1 | M | Invalidate all EL1 entries | 2'b0x | Y | Y |
| SCTLR_EL1 | C | Invalidate all EL1 entries | 2'b0x | Y | N |
| SCTLR_EL1 | I | Invalidate all EL1 entries | 2'b0x | N | Y |
| VTTBR_EL2 | Any | Invalidate all EL1 entries | 2'b0x | Y | Y |
| HCR_EL2 | TGE | Invalidate all EL1 entries | 2'b0x | Y | Y |
| HCR_EL2 | CD | Invalidate all EL1 entries | 2'b0x | Y | Y |
| HCR_EL2 | ID | Invalidate all EL1 entries | 2'b0x | N | Y |
| SCTLR_EL2 | M | Invalidate all EL2 entries | 2'b1x | Y | Y |
| SCTLR_EL2 | C | Invalidate all EL2 entries | 2'b1x | Y | N |
| SCTLR_EL2 | I | Invalidate all EL2 entries | 2'b1x | N | Y |

Figure 7

METHOD AND APPARATUS FOR PERFORMING TABLE LOOKUP

FIELD

The present disclosure relates to the field of computing. In particular, the present disclosure relates to method and apparatus for performing table lookup.

BACKGROUND

Conventional methods typically utilize multiple structures for storing multiple page sizes. In some cases where unified structures are used for storing multiple page sizes, no control or programmability is provided to optimize the order and lookup sequence for a particular translation table tree.

Therefore, there is a need for system and method that address the drawbacks of the conventional methods and approaches.

SUMMARY

The present disclosure relates to method and apparatus for performing table lookup. The method stores multiple page sizes in a unified translation look-aside buffer (TLB) structure and provides a configurable/optimized sequencing facility of TLB lookups in the unified structure. The lookup sequencing is based on page sizes and global versus non-global pages. There is both a generic aspect and an ARM architecture-specific aspect to this (e.g. two translation modes—AArch32 and AArch64, each with their own set of page sizes). Further, separate sequence configurability is provided for each translation table tree within the OS, for Hypervisor Stage-2 tables, and for Hypervisors own Stage-1 translation table tree.

In one embodiment, the method includes providing a lookup table, where the lookup table includes a plurality of translation modes and each translation mode includes a corresponding translation table tree supporting a plurality of page sizes. The method further includes receiving a search request from a requester, determining a translation table tree for conducting the search request, determining a lookup sequence based on the translation table tree, generating a search output using the lookup sequence, and transmitting the search output to the requester. The plurality of translation modes includes a first set of page sizes for 32-bit operating system software and a second set of page sizes for 64-bit operating system software. The plurality of page sizes includes non-global pages, global pages, and both non-global and global pages. The translation table tree includes at least one of Hypervisor Stage-1 translation table tree, Hypervisor Stage-2 translation table tree, non-Hypervisor Stage-1 kernel translation table tree, and non-Hypervisor Stage-1 user translation table tree.

The method of determining a translation table tree includes determining a set of preprogrammed page sizes and action fields of the translation table tree to be followed in conducting the search request. The method of determining a lookup sequence includes identifying a sequence for translation level 2 arbitration, identifying a sequence for translation level 2 lookup, identifying a sequence for translation level 2 compare, identifying a sequence for translation level 2 match, and identifying a sequence for translation level 2 output. The method of generating a search output using the lookup sequence includes conducting a sequence of lookups according to a predetermined page size in a pipelined manner. The search output includes at least one of a most recently used virtual address to physical address translation, a most recently used intermediate address to physical address translation, and a most recently used physical address to physical address translation.

In another embodiment, a computer program product for performing table lookup, includes a non-transitory medium storing computer programs for execution by one or more computer systems; and the computer program product includes code for providing a lookup table, where the lookup table includes a plurality of translation modes and each translation mode includes a corresponding translation table tree supporting a plurality of page sizes. The computer program product further includes code for receiving a search request from a requester, code for determining a translation table tree for conducting the search request, code for determining a lookup sequence based on the translation table tree, code for generating a search output using the lookup sequence, and code for transmitting the search output to the requester.

The code for determining a translation table tree includes code for determining a set of preprogrammed page sizes and action fields of the translation table tree to be followed in conducting the search request. The code for determining a lookup sequence includes code for identifying a sequence for translation level 2 arbitration, code for identifying a sequence for translation level 2 lookup, code for identifying a sequence for translation level 2 compare, code for identifying a sequence for translation level 2 match, and code for identifying a sequence for translation level 2 output. The code for generating a search output using the lookup sequence includes code for conducting a sequence of lookups according to a predetermined page size in a pipelined manner.

In yet another embodiment, a memory management apparatus includes a lookup table that has a plurality of translation modes and each translation mode includes a corresponding translation table tree supporting a plurality of page sizes. The memory management apparatus further includes one or more processors, a memory management controller working with the one or more processors, where the memory management controller includes logic configured to receive a search request from a requester, logic configured to determine a translation table tree for conducting the search request, logic configured to determine a lookup sequence based on the translation table tree, logic configured to generate a search output using the lookup sequence, and logic configured to transmit the search output to the requester.

The logic configured to determine a translation table tree includes logic configured to determine a set of preprogrammed page sizes and action fields of the translation table tree to be followed in conducting the search request. The logic configured to determine a lookup sequence includes logic configured to identify a sequence for translation level 2 arbitration, logic configured to identify a sequence for translation level 2 lookup, logic configured to identify a sequence for translation level 2 compare, logic configured to identify a sequence for translation level 2 match, and logic configured to identify a sequence for translation level 2 output. The logic configured to generate a search output using the lookup sequence includes logic configured to conduct a sequence of lookups according to a predetermined page size in a pipelined manner.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIGS. 2a and 2b illustrate an exemplary unified level two table entry format according to some aspects of the present disclosure.

FIG. 3a illustrates exemplary hash functions for virtual address and physical address set index according to some aspects of the present disclosure.

FIG. 3b illustrates exemplary hash functions for various types of accesses according to some aspects of the present disclosure.

FIG. 4a illustrates an exemplary memory management lookup pipeline according to some aspects of the present disclosure.

FIG. 4b illustrates an exemplary pipelined search according to some aspects of the present disclosure.

FIG. 5a illustrates an exemplary page sequence control register according to some aspects of the present disclosure.

FIG. 5b illustrates exemplary action filed encodings for a page sequence control register according to some aspects of the present disclosure.

FIG. 5c illustrates exemplary page size encodings for a page sequence control register according to some aspects of the present disclosure.

FIG. 5d illustrates another exemplary page size encodings for a page sequence control register according to some aspects of the present disclosure.

FIG. 5e illustrates exemplary reset and initialization values for page sequence control registers according to some aspects of the present disclosure.

FIG. 6 illustrates exemplary level 1 table commands and their corresponding directory actions according to some aspects of the present disclosure.

FIG. 7 illustrates exemplary special purpose register writes and their corresponding directory action according to some aspects of the present disclosure.

DESCRIPTION OF EMBODIMENTS

The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein.

Some portions of the detailed description that follows are presented in terms of flowcharts, logic blocks, and other symbolic representations of operations on information that can be performed on a computer system. A procedure, computer-executed step, logic block, process, etc., is here conceived to be a self-consistent sequence of one or more steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Figure 1:
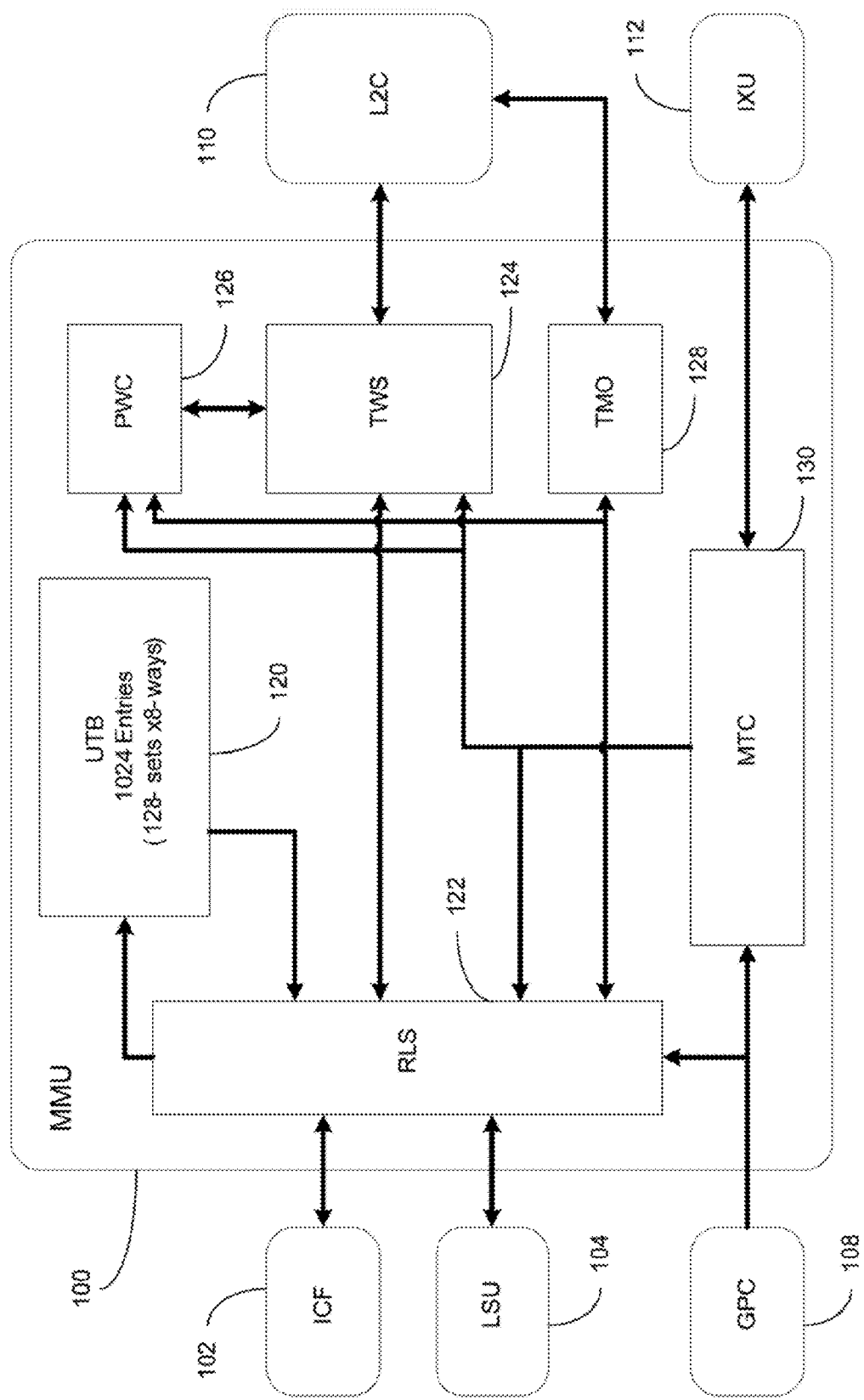
FIG. 1 illustrates a block diagram of memory management unit according to some aspects of the present disclosure.

FIG. 1 illustrates a block diagram of memory management unit according to some aspects of the present disclosure. As show in FIG. 1, the Memory Management Unit (MMU) 100 provides virtual to physical address (VA to PA) translation services to the instruction cache and fetch (ICF) 102 and load/store (LSU) 104 units of the disclosed processor. Instruction VAs are generated by the ICF for sequential instruction fetches and for addresses that correspond to a change in program flow (branches, exceptions). Data VAs are generated by load, store, address translation and cache management instructions.

To reduce the amount of time it takes to service a translation request, the MMU caches translations or translation table entries. This avoids the requirement for every memory access to perform a translation table lookup (also referred to as a table walk). In one implementation, the MMU TLB includes 1024 entries and is organized as 128 sets, each set being 8-way set-associative. The TLB caches both Instruction and Data translations and hence is considered a Unified TLB (UTB). In the following descriptions, the MMU TLB is commonly referred to as the UTB or the Level-2 TLB (L2 TLB).

The MMU 100 receives translation requests from the ICF 102 and LSU 104, processes them, and returns a translation result to the respective unit. This can either be a successful translation or an exception condition that was detected during the translation process. The MMU 100 services one translation request at a time (in series) and in that sense is not a pipelined unit. The MMU 100 also interfaces with a global pipelined control (GPC) 108 that provides configuration information to the MMU 100.

The disclosed exemplary architecture provides TLB maintenance operations to manage TLB contents in software. These operations can be local (affecting just the processor executing them) or global (affecting processors within a shareable domain). In the disclosed processor architecture, TLB maintenance operations may be issued to the MMU 100 via the L2C 110 (Level-2 Cache). The TLB maintenance operations are processed in order and in a manner that allows other activity in the MMU 100 to make forward progress, including accessing page table entries (PTEs) from memory. The disclosed exemplary architecture also provides a mechanism, via the data synchronization barrier (DSB) instruction, to synchronize the effect of TLB maintenance operations that occurred in program order prior to the completion of the DSB. The disclosed processor may be implemented via a mechanism referred to as a TLB Sync operation. TLB Sync operations are also issued to the MMU 100 via the L2C 110.

The disclosed processor supports a two-level TLB scheme. The ICF 102 and LSU 104 include small L1 TLBs called the level 1 instruction TLB (ITB) and level 1 data TLB (DTB) respectively. The ITB and DTB are software transparent and are not maintained as a subset of the UTB. The MMU 100 detects a need to invalidate entries in the ITB/DTB and issues the appropriate invalidate commands via the respective interfaces between the units.

The MMU 100 also supports virtualization in hardware per the disclosed Virtualization Extensions. This is done by introducing an Intermediate Physical Address (IPA). The IPA represents the Guest OS view of its own page tables or "physical address space". Since the Guest OS is running on top of a virtualization layer (commonly referred to as a Hypervisor), the method may map the IPA to a PA according to the actual partitioning of system memory/resources. A specific Guest OS is unaware that it is sharing the underlying hardware/memory with other Guest OSes. It is the responsibility of the Hypervisor to manage the underlying system memory/resources and provide the necessary protection and isolation of Guest OSes from each other.

In the disclosed exemplary architecture, virtualization is supported by introducing a two stage hardware translation scheme. For exception level 0/exception level 1 (EL0/EL1) requests, Stage-1 handles VA to IPA translations and Stage-2 handles IPA to PA translations. Hypervisor (EL2) requests may use Stage-1 translations where a VA is translated directly to a PA.

According to embodiments of the present disclosure, the MMU 100 includes the following logical sub-unit level modules (SLMs): 1) Unified L2 TLB (UTB) 120; 2) Request interface and Lookup Sequencer (RLS) 122; 3) Table Walk Sequencer (TWS) 124; 4) Page Walk Cache (PWC) 126; 5) TLB Maintenance Operations (TMO) 128; and 6) MMU Translation Control (MTC) 130. The following describes the high level functions that each SLM implements within the MMU 100.

The Unified L2 TLB (UTB) 120 caches final address translations (VA to PA) requested by the ICF and LSU as well as Stage-2 address translations (IPA to PA) requested by the TWS 124. Note that the final VA to PA translations combines both Stage-1 and Stage-2 information.

The Request interface and Lookup Sequencer (RLS) 122 implements the following functions:

Receives, arbitrates and processes translation requests from the ICF 102, LSU 104, TWS 124 and TMO 128.

Provides UTB 120 lookup services to the various requestors. Implements the Page Size and Lookup Sequencer based on the respective Page Sequencer Control Register (PSCR).

Updates the most recently used (MRU) bit vector on a UTB hit.

Invalidates entries in a set upon detecting parity errors.

Generates a table walk request to the TWS 124 on a UTB miss.

Returns translation results to the various requestors when done.

Allocates and writes a new VA→PA entry into the UTB 120 upon completion of a table walk.

Allocates and writes new IPA→PA entries into the UTB 120 during a table walk.

Receives and processes TLB maintenance operations from the TMO 128.

Issues invalidation commands to the PWC 126 as a result of TMO operations.

Maintains the DTB/ITB directories and issues L1-TLB invalidations as needed, based on TMO operations, as well as some MTC special purpose register (SPR)/configuration register changes.

Generates look ups in the PWC 126 so that TWS 124 can use the results (on hits) to reduce the number of memory accesses required for a table walk.

The Table Walk Sequencer (TWS) 124 implements the following functions:

Receives table walk requests from the RLS 122 and processes them accordingly. Returns the final VA to PA translation as well as intermediate IPA to PA translation results to the RLS 122.

Receives results from the PWC 126 to reduce the number of memory accesses required during a table walk.

Allocates and writes new MPTEs (Modified PTEs) to the PWC 126 as needed.

When virtualization is enabled and a Stage-2 translation is required, generates a translation request to the RLS 122 and waits for a response.

Determines the memory region attributes to be used with a mapping/translation as well as with the individual PTE read requests.

Issues PTE read requests to the L2C 110 and waits for the return of the appropriate data.

The Page Walk Cache (PWC) 126 caches Stage-1 and Stage-2 MPTEs for various levels of a table walk. This helps reduce the number of memory accesses that are required to walk the page tables.

The TLB Maintenance Operations (TMO) 128 implements the following functions:

Receives TLB maintenance operation commands from the L2C 110.

Issues TLB invalidation requests and commands to the RLS 122.

Implements the TLB Sync operation.

The MMU Translation Control (MTC) 130 implements the following functions:

Holds the MMU configuration registers and responds to SPR read and write requests from the IXU.

Distributes configuration information to the other SLMs that need it, such as RLS 122 and TWS 124.

Sends invalidation requests as needed to PWC 126 and RLS 122. Some changes to SPR/configuration registers that control translation require that corresponding PWC 126 entries and DTB/ITB mappings be invalidated.

Interfaces with an integer execution unit (IXU) 112 to support read/write of MMU configuration registers inside the MTC 130.

The MMU 100 includes a single Unified Level-2 TLB which it uses to cache address translations requested by the ICF 102, LSU 104 and TWS 124. In one implementation, the UTB includes 1024 entries logically organized as 128 sets, each set being 8-way set-associative. When referring to the UTB, the term entry and way are used synonymously in this disclosure.

The UTB 120 caches two types of address mappings, Virtual to Physical (VA to PA) and Intermediate Physical to Physical (IPA to PA). IPA to PA mappings exist when virtualization is enabled and come from Stage-2 page tables. Note that the last level of IPA to PA mapping is not cached in the UTB 120 since the corresponding VA to PA mapping for the overall translation has already been cached. VA to PA entries supports page sizes of 16 GB, 1 GB, 512 MB, 32 MB, 16 MB, 2 MB, 1 MB, 64 KB and 4 KB. IPA to PA entries supports page sizes of 16 GB, 1 GB, 512 MB, 32 MB, 2 MB, 64 KB and 4 KB.

FIGS. 2a and 2b illustrate an exemplary unified level two table entry format according to some aspects of the present disclosure. FIGS. 2a and 2b provide a description of the various bits included in an entry of the UTB. The table is separated into Tag and Data sections. Each entry has 111 bits, 62 bits of Tag and 49 bits of Data. The 1 MB and 16 MB page sizes are available when EU is in a 32-bit architecture (for example the Arm 32-bit architecture) and the LPAE extensions are disabled. In other modes, these page sizes may not be available. When EU or EL2 are in a 64-bit architecture (for example the Arm 64-bit architecture) and the granule is 64 KB, a 512 MB page may also be available. This uses the same encoding as the 16 MB page size. This may be handled since the situation where a 16 MB page and a 512 MB page can reside in the UTB at the same time is when EL1 is in Arch32-No-LPAE and virtualization is enabled and either TTBR0_EL2 or VTTBR_EL2 use a 64 KB granule. In either case, the 16 MB page and 512 MB page are disambiguated from each other by the Tag.H or Tag.S2 bits.

Note that fields of the Tag section, with the exception of the Tag.MRU bit, participate in the compare function on a UTB lookup. In some cases and as needed, certain fields are ignored in the comparison. Notes regarding the Data section in the UTB:

- The AP[2:0] Reserved encoding is not used. This encoding is mapped on to Privilege Read Only, User No Access.
- When Stage-1 or Stage-2 are disabled:
    - The relevant permissions field for each stage is set to allow full access. The ICF and LSU can rely on this to do their normal permission checking for the respective Stage and this may not result in a permissions violation.
    - The Table Level Fields, TLS1[1:0] and TLS2[1:0] are set to 2'b00 respectively. This means that if Stage-1 is disabled, then TLS1[1:0] is set to 2'b00, or if Stage-2 is disabled, TLS2[1:0] is set to 2'b00. As an alternative to the previous bullet, the ICF and LSU can rely on this to ignore permission checking for the corresponding Stage.
- The DMN[3:0] field is valid for EL0/EL1 in a 32-bit architecture (for example Arm 32-bit architecture) when the LPAE extensions are disabled. It is otherwise undefined, but the MMU will set it to 4'b0000 (Domain 0x0) for these cases.
- For IPA to PA mappings (Stage-2 entries used during table walks in the MMU), the valid fields are PA[41:12], MTA[1:0] and TLS2[1:0]. Other fields are undefined, but the MMU will set them to predictable values.
- The MTA[1:0] and CWT fields in the UTB reflect the results of a table walk and do not take into account the SCTLR_ELn.0 or SCTLR_ELn.I bits. These are factored in external to the UTB when returning a Result-MemType to the ICF or LSU.

As described above, the UTB holds both VA to PA and IPA to PA mappings. In addition, it holds supported pages sizes for these mappings. A particular mapping of a VA or IPA for a page size can be found in a specific set (of the 128) and in one of the ways (of the 8) within a set. The specific set is determined by the set index (SetIndex) used to allocate the entry. To enhance the distribution of the various pages and their corresponding page sizes within the UTB, a hash function may be applied when generating the SetIndex. This helps to reduce the amount of thrashing (within a set) for a given page size as well as between the various page sizes.

Each page size has a different hashing function and that hashing function is fixed (not programmable). Further, due to the different number of bits supported for VA versus IPA (49 for VA and 42 for IPA), the hashing functions are different for VA and IPA lookups. FIG. 3a describes the different base hashing functions for the various page sizes and for both VA and IPA lookups. Note that as the page sizes increase, the additional page-offset bits for the respective page size are excluded from the hashing function. This is required for correct functionality.

For each page size in the table, the hashing function described is a base hash function. This base hash function can be further hashed with the ASID[13:0] and/or VMID[6:0] and/or a Constant. ASID[15:14] and VMID[7] may not participate in hashing functions. When allocating a new UTB entry, the additional hashing is determined by the type of access (EL0/EL1, EL2, or Stage-2) as well as the page tables (global versus non-global).

Note that in Arm 32-bit architecture, bits [15:8] of the ASID are forced to 8'b0. Similarly, in Arm 64-bit architecture, it may select whether the ASID is an 8 or 16 bit field. If an 8 bit ASID field is selected, bits [15:8] are again forced to 8'b0. This effectively removes them from the hashing function. The hardware is oblivious of this and implements the same exclusive-or function in other modes.

FIG. 3a illustrates exemplary hash functions for virtual address and physical address set index according to some aspects of the present disclosure. The purpose of incorporating the ASID into the hash function is to reduce thrashing between identical VA pages belonging to different processes (within a guest OS) that would otherwise map to the same set. This causes them to get distributed among different sets.

A similar reasoning applies for the use of the VMID as part of the hashing function for EL0/EL1 VA to PA mappings as well as Stage-2 IPA to PA mappings. The difference in this case is that this reduces thrashing between identical VA+ASID (non-Global), VA (Global) and IPA pages belonging to different virtual machines (different guest OSes) that would otherwise map to the same set.

The purpose of incorporating a Constant into the hash function is motivated by trying to move global-EL0/EL1 and EL2 pages away from potentially skewed Set occupancy of non-global EL0/EL1 pages due to a non-uniform distribution of ASIDs within a guest OS and/or VMIDs within a virtualized environment.

FIG. 3b illustrates exemplary hash functions for various types of accesses according to some aspects of the present disclosure. In this example, FIG. 3b describes the final hash function when the additional hashing components are included. Note that EL2 and Stage-2 translations have their own page table base registers, HTTBR and VTTBR respectively, and their page tables do not support global versus non-global page mappings.

Note that when a guest OS uses a mix of global and non-global pages for specific page sizes, the UTB may be searched with and without the additional hashing. Note that this may be relevant for EL0/EL1 pages. As described above, EL2 or Stage-2 (IPA to PA) mappings do not support global pages.

For both VA and IPA, the smallest page size supported is 4 KB. In the case of a 4 KB page, bits 18:12 (corresponding to 128 sets) are used as part of the hash function to generate the VaSetIndex[6:0] or the IpaSetIndex[6:0]. This means that they may not be part of address Tag for the purpose of determining a match, hence the Tag starts at bit 19 and goes up to bit 48 (for a VA mapping) or bit 41 (for an IPA mapping). In other words, the smallest page size determines the size of the address Tag required for an address match. This works correctly for bits 18:12 of the VA or IPA may not be hashed with each other, but with bits 19 and up (see FIG. 3a). This guarantees that 4 KB or 64 KB pages that differ in bits 18:12 or 18:16 respectively, may end up in different sets and therefore may be disambiguated from each other even though bits 18:12 and 18:16 are not part of the tag compare.

When allocating an entry for a page size larger than 64 KB (i.e. 1 MB or larger), the additional page-offset bits (above bit 18) corresponding to the specific page size are set to 1'b0 in the address tag. When a lookup occurs for a page size greater than 64 KB, the additional page offset bits corresponding to the specific page are forced to 1'b0 on the Tag compare input of the UTB. This is required for correct operation, otherwise the page-offset bits being compared could result in a false mis-match.

When doing a lookup for a page size greater than 4 KB (i.e. 64 KB or larger), the method may avoid false matches of a larger page with a smaller one. By incorporating the Tag.PS [2:0] (Page Size bits) as part of the match function, the MMU disambiguates false matches on the address Tag.

When allocating an entry for a page size greater than 4 KB, the unused page offset bits of the Data.PA[41:12] are set to 1'b0. This is required due to the way the muxing is implemented for the page offset portion of the PA[41:12] when a match occurs on an entry with a page size greater than 4 KB.

Note that the L1 TLBs support VA to PA mappings and page sizes of 1 MB, 64 KB and 4 KB. When returning the result of a translation request to the ICF or LSU, if the page size is larger than 1 MB, the MMU may atomize it down to a 1 MB page. Note that the MMU may not atomize down relative to the page size found in the page tables with respect to entries that the UTB caches. This means that the page size stored in a UTB entry reflects the page size found in the Stage-1 page tables. When virtualization is enabled, and the MMU encounters a situation where Stage-1 page size is greater than Stage-2 page size, it will not cache the final translation in the UTB. The disclosed exemplary architecture specifies that TLB maintenance operations may be performed based on the page size found in the page tables. If the MMU were to cache the case of Stage-1 page size being greater than Stage-2 page size, it would have to atomize down the page size according to Stage-2. This means that when a Guest OS issues a TLB maintenance operation by VA, the MMU would have to search for the possibilities of potential atomization of larger pages to smaller ones. This would make TLB maintenance operations by VA much lengthier than they already are. While not caching these sort of entries may have a negative performance impact, this situation (Stage-2 page size being smaller than Stage-1) is considered as an unlikely scenario. Typically, Hypervisor will manage Stage-2 mappings in larger chunks and therefore not caching these situations seems acceptable. In addition, these pages will be allocated in the L1 TLBs, allowing subsequent accesses to the same page to proceed at full speed (translation wise), hence not caching them in the UTB should not be an issue.

According to embodiments of the present disclosure, the MMU employs a Not Recently Used (NRU) replacement algorithm for allocating UTB entries. This algorithm is also referred to as a pseudo-LRU scheme. The algorithm is implemented as follows:

Each set within the UTB has an 8-bit vector where each bit represents a Used bit (Tag.MRU) for the corresponding entry within the set. These bits are cleared by hardware reset.

When an entry is hit upon and accessed, its Used bit is set. If this would result in 8 entries being set, then other bits are cleared and the accessed entry's Used bit is set.

When doing an allocation to a particular set, the 8 bit Used vector is scanned for a zero. The scan starts at a bit pointed to by a 3-bit Global Replacement Pointer. The first Used bit found that is set to zero defines the entry to be replaced.

The Global Replacement Pointer is shared among the 128 sets of the UTB. After selecting an entry for replacement, the pointer is incremented by one. The pointer will wrap around from last bit to first bit if it was pointing to 3'b111. The pointer is initialized to 3'b000 by hardware reset.

On UTB invalidations (TLB maintenance operations), the corresponding invalidated entries will have their used bits cleared.

Since the Global Replacement Pointer is shared among the sets, replacement is somewhat more random (among older entries within a set) relative to each set having its own replacement pointer. The Global Replacement Pointer is initialized by CacheInit in conjunction with the initialization of the MRU bits.

Allocations (or replacements) occur on UTB misses when the MMU obtains a new translation from the page tables. The MMU determines the entry to be replaced at the end of a table walk, when it is ready to write the new entry into the UTB. The page size and the global/non-global page attribute for the entry being allocated are determined by the final PTE read from the tables. Both of these affect the SetIndex hash function which is required for determining in which set to allocate the new entry. In addition, on every table walk, the UTB may be accessed multiple times to search for IPA to PA mappings. These lookups affect the Used bit vectors of the corresponding sets that they hit on. As part of writing a new entry to the UTB, the MMU does a Read-Modify-Write to the set where the allocation occurs. The Read is done to obtain the entry to be replaced (via the Used bit vector). The Write is done to write the new entry and update the Used bit vector.

In addition to the normal MRU behavior, the MRU bits are also cleared in the following situations:

During initialization when the Inn signal is asserted. The MRU bits in the sets are cleared When an entry is invalidated due to a TLB invalidation operation, its corresponding MRU bit is cleared Note that the software is capable (through programming errors) of creating overlapping entries within the UTB with different page sizes. This would normally result in multiple matches, but due to the way the MMU does lookups within the UTB, multiple matches cannot occur. The MMU searches for a specific page size on each lookup. The matching function for that page size takes into account the Tag.PS[2:0] bits. The MMU terminates a lookup sequence as soon as a matching page is found in the UTB. This means that the MMU may not encounter multiple matches when doing a lookup in the UTB.

Single bit errors can also be a source of multiple matches, but they would also cause a parity error and hence they would be addressed via the parity detection and error handling. Multi-bit errors can also be a source of multiple matches, but the probability of these is considered sufficiently low that no attempt is made to address these in hardware. The exception is the L2C unit level module (ULM) where single-bit errors are corrected and two-bit errors are detected. The other ULMs that incorporate parity protection, do not detect multi-bit errors.

The UTB is initialized when the hardware init signal is asserted. The UTB cycles through the 128 sets and clears the Tag. {V,MRU,CWT} bits while setting their corresponding parity bit to 1'b0 (even parity). Other fields are unaffected. This reset initialization sequence takes about 64 cycles since both banks may be written in parallel.

The MMU provides address translation services to 3 requestors from the processor core—the Load and Store pipes within the LSU and the Instruction Fetch pipe within the ICF. These can arrive simultaneously on the MMU request interfaces. The MMU processes translation requests from the processor core in a serial manner, i.e. one request at a time. The RLS arbitrates between these requestors. Processor core requests are prioritized as follows:

Load translation request

Store translation request

Instruction fetch translation request

Each requestor can issue one request before receiving a response from the MMU. Since the MMU overlaps a new arbitration cycle (T2A) with a preceding request's response cycle (T2R), it is guaranteed that a different requestor will win arbitration (relative to the one just receiving its response).

There are two additional sources of requests from within the MMU, referred to as internal MMU requests. One request comes from the TWS during a table walk, when a Stage-2 IPA to PA lookup, or a new entry allocate/write is required. The other request comes from the TMO when a TLB maintenance operation is pending or in progress. TMO requests originate from the L2C and can come from a processor core within the shareable domain. The internal MMU requests have higher priority than processor core requestors.

To summarize, the overall request priority is as follows:
TMO request
TWS request (Stage-2 translation or allocate/write new entry)
Load translation request
Store translation request
Instruction fetch translation request By definition, the TWS requestor has higher priority than a pending processor core requests since it is actually in the middle of processing one of them. The arbitration scheme for processor core requests is such that while one is being processed, the other two are locked out of a RLS arbitration.

While the TMO requests have highest priority, the MMU processes these in a manner that allows processor core requests to make forward progress, including accessing PTEs from memory. The primary resource required by a TLB maintenance operation is lookup and write access to the UTB. The MMU can be in the middle of a table walk, but if the UTB is accessible, a TMO operation can proceed.

FIG. 4a illustrates an exemplary memory management lookup pipeline according to some aspects of the present disclosure. In the example shown in FIG. 4a, the basic MMU lookup pipeline is a 5 stage pipe. These are the actions typically performed in each stage of the lookup pipeline when a processor core request is being processed.

In one approach, functions performed by the Translation level 2 Arbitration (T2A) include:
Arbitrate between the various requesters.
Determine which page size to look up.
Partial processing of the lookup address to generate the SetIndex[6:0].
Record requests that lose arbitration in the current arbitration cycle so that they can participate on the next available arbitration cycle.

Functions performed by the Translation level 2 Lookup (T2L) include:
Complete processing of lookup address to generate the SetIndex[6:0].
Select source of the SetIndex[6:0] (ICF, LSU or MMU internal).
Distribute the relevant hashed SetIndex[6:0] address bits to the TagRam macros and enable the relevant bank for a read and compare access.
Send the Tag Compare inputs to the TagRam macros that hold the tag part of the entry.

Functions performed by the Translation level 2 Compare (T2C) include:
Do a read access of the TagRams.
Setup the relevant Tag compare inputs to the TagRam macros for doing the UTB Tag compare function. The compare in each TagRam is done in T2C and is available by the end of the cycle.
Send a speculative result valid to the appropriate requestor.

Functions performed by the Translation level 2 Match (T2M) include:
Determine hit/miss for a specific page size.
On a hit, signal result valid to the appropriate requestor, otherwise prepare to issue a table walk request to TWS on the next cycle.
Select one of the 8 matching ways, format the translation result and register at the end of the cycle for a response in T2R. This result is valid on a hit.
If needed, prepare to update the MRU bit vector at the end of the cycle.
Detect parity errors. Register at end of cycle for use on the following cycle.

Functions performed by the Translation level 2 Result (T2R) include:
Return translation result to the appropriate requestor and signal parity error if needed. Note that in the hit case, this stage occurs right after T2M. In the miss case, this stage occurs at the completion of a table walk when RLS is updating the UTB and creating the appropriate response timing for the requestors.
If a response is returned on this cycle without a parity error (i.e. result valid was asserted on the previous cycle), then overlap the next T2A with this T2R.
If response is returned on this cycle with a parity error, insert a once cycle bubble between this T2R and the next T2A. This allows for invalidating the set with the parity errors.

On a miss, the following activity occurs in the cycle following T2M:
Issue a table walk request to TWS.
If no parity errors detected in T2M, transition to "idle state while waiting for table walk completion"
If parity errors were detected in T2M, transition to "idle state while waiting for table walk completion" and invalidate the set with the parity errors.

In one approach, when the MMU processes a translation request, it may search for multiple page sizes that may be supported for the VA or IPA in question. In addition to searching for multiple page sizes, the MMU may also search for a specific page in two locations within the UTB. This is required when a mix of non-global and global pages are used for mappings of VA to PA. The search for multiple page sizes or one page in multiple locations is done by pipelining the lookups for the various page sizes. FIG. 4b illustrates an exemplary pipelined search according to some aspects of the present disclosure.

The pipelining of lookups is done by overlapping the T2A of the current lookup with the T2L of the previous one, and the T2L of that one with the T2C of the one before that, and the T2C of that one with the T2M of the one before that, and so on. This is shown in FIG. 4b for a sequence of lookups associated with Request-A. Note that the "clear shaded" T2A cycles are shown for their role in the pipeline. These T2A cycles do not allow arbitration to occur, but for other intents and purposes, they behave as a T2A pipeline stage. The following describes in more detail the specific sequence presented in FIG. 4b.

On cycle #1, Request-A wins arbitration. On cycle #2, the SetIndex for the first lookup is sent to the TagRam macros and the appropriate bank is enabled for read. On cycle #3, the MMU looks up the first page in the sequence which is a 4 KB non-global page size. On cycle #4, the MMU is detecting a miss on the 4 KB page search while also looking up the second page in the sequence which is a 4 KB global page. The difference between a global and non-global lookup has to do with the set that the MMU searches in. A non-global search will look up a set with the ASID/VMID in the SetIndex hash function. A global search will not factor the ASID/VMID into the hash function. On cycle #5, the MMU is detecting a miss on the 4 KB global page search and is looking up the next page in the sequence which is a 64 KB page. This goes on until cycle #8 when the MMU detects a hit on a 16 MB page search. Note that while subsequent page size lookups have already started, they will be discarded. On cycle #9, the MMU returns the result to the Requestor of Request-A and in parallel arbitrates between new or pending requests. Request-B wins arbitration (in cycle #9) and then starts its lookup sequence in cycle #10.

So while translation requests are handled in a serial manner, a multi-page search in the UTB for a specific request is handled in a pipelined manner. The pipelined lookup sequence is effectively overlapping the T2M of one page search with the T2C of the next page search. This goes on until a matching page is found or the sequence is terminated without a match, which is effectively a UTB miss.

The sequence and order by which the MMU searches for a mapping within the UTB are controlled by the Page Sequence Control Registers (PSCRs). These are a set of 4 registers, each one 32-bits wide. Each PSCR register corresponds to one of the base types of mapping registers, i.e. TTBR0, TTBR1, HTTBR and VTTBR (also known as TTBR0_EL1, TTBR1_EL1, TTBR0_EL2 and VTTBR_EL2 within Arm 64-bit architecture).

The Page Sequence Control Registers are implementation defined and are exposed to system level software. The registers are initialized by hardware reset to values that will work for exception levels and translation modes supported by the MMU. This means that even if these registers may not be touched by system software, the MMU will operate correctly, though translation performance may not be optimal. To obtain optimal translation performance it is recommended that system software (the relevant memory management parts of it) program these registers appropriately.

Note that when changing the values in these registers, changing the order of page size lookups does not require TLB maintenance operations. On the other hand, changing the page tables and page sizes associated with tables does require system software to apply TLB maintenance operations and then reconfigure the appropriate PSCR. In summary, system software should take the necessary care when reconfiguring the PSCRs dynamically.

The PSCR registers are named as follows:
TB0PSCR_EL1-TTBR0_EU Page Sequence Control Register (non-Hypervisor Stage-1 kernel translation table tree).
TB1PSCR_EL1-TTBR1_EU Page Sequence Control Register (non-Hypervisor Stage-1 user translation table tree).
TB0PSCR_EL2-TTBR0_EL2 Page Sequence Control Register (Hypervisor Stage-1 translation table tree).
VTBPSCR_EL2-VTTBR_EL2 Page Sequence Control Register (Hypervisor Stage-2 translation table tree or Stage-2 translation table tree).

FIG. 5a illustrates an exemplary page sequence control register according to some aspects of the present disclosure. In the example shown in FIG. 5a, each register includes six entries where each Entry-n (n=0 to 5) is a 5-bit field that is the concatenation of the respective PSn and AFn fields shown in FIG. 5. The PSn[2:0] field specifies a page size and the AFn [1:0] specifies an action to be taken. Bits 31:30 of the PSCR registers are RAZ/WI. Each register can be programmed to sequence up to 6 page size lookups. In the case of the TB0PSCR_EL1/TB1PSCR_EL1, one approach is to program a sequence of up to 12 lookups where each page size requires a lookup for both non-global and global pages. The non-global page hash is used for the first lookup and the global page hash is used for the second lookup in the two lookup sequence.

The encoding of the AFn[1:0] field and its corresponding action is shown in FIG. 5b, for each of the 4 types of PSCR registers. Note that for TB0PSCR_EL2 and VTBPSCR_EL2 there are RESERVED encodings. Software may not program the AFn[1:0] field to RESERVED values. If software programs the RESERVED values accidentally or maliciously, the hardware will behave in a predictable manner as described in FIG. 5b.

FIG. 5b illustrates exemplary action filed encodings for a page sequence control register according to some aspects of the present disclosure. The encodings of the PSn fields and their mappings to page sizes for the case of a 4 KB and 64 KB granules are described in FIG. 5c and FIG. 5d respectively.

The encodings allowed and their interpretation depends on the PSCR register as well as the operating mode of the MMU. For EU of Arm 32-bit architecture, TB0PSCR EU is used for both TTBR0 and TTBR1. For EU of Arm 64-bit architecture, TTBR0 EU and TTBR1_EL1 each have their own PSCR register, TB0PSCR_EL1 and TB1PSCR_EL1 respectively. For EU Stage-2, VTBPSCR_EL2 controls the lookup sequence. For EL2 accesses, TB0PSCR_EL2 controls the lookup sequence. In the disclosed processor, EL1 Stage-2 and EL2 are by definition of the Arm 64-bit architecture.

For various modes, encodings 3'b11x are RESERVED. When EL1 is operating in Arm 32-bit architecture and the LPAE extensions are disabled, PSn[2:0] values of 3'b10x are RESERVED. If software programs the relevant PSCR register to RESERVED values, the hardware will ignore them and interpret the corresponding action field (AFn[1:0]) as "terminate sequence" according to FIG. 5b.

FIG. 5c illustrates exemplary page size encodings for a page sequence control register according to some aspects of the present disclosure. The encodings of the PSn fields and their mappings to page sizes for the case of a 64 KB granule are described in FIG. 5d. Note that the 64 KB granule may be supported in Arm 64-bit architecture mode. Also, the granule can be programmed on a per translation base register, hence on per PSCR register as well. PSn[2:0] Encodings of 3'b1xx are RESERVED. If software programs the relevant PSCR register to RESERVED values, the hardware will ignore them and interpret the corresponding action field (AFn[1:0]) as "terminate sequence" according to FIG. 5b.

FIG. 5d illustrates another exemplary page size encodings for a page sequence control register according to some aspects of the present disclosure. In this example, the hardware determines which PSCR register to use as follows:
For an EL0/EL1 request (Stage-1) in Arm 64-bit architecture, TB0PSCR EU or TB1PSCR EU is selected based on the VA[48] bit.
For an EL0/EL1 Stage-1 request in Arm 32-bit architecture, TB0PSCR_EL1 is selected.
For an EL2 request, TB0PSCR_EL2 is selected.
For an EU Stage-2 request, VTBPSCR_EL2 is selected.

The hardware will start the lookup sequence from Entry-0 and continue through Entry-5, unless it encounters a 2'b00 (Terminate Sequence) in the AFn field or it encounters a matching page within the UTB. When 2'b00 is encountered in the AFn field, and there has been no matching page in the UTB until that point, the sequencer exits the lookup sequence and initiates a table walk request to TWS. When the TWS completes the table walk, it will return a result to the RLS, and a new entry will get written into the UTB if the page size of the translation matches one of the active pages in the respective PSCR. Note that there is an implied priority in determining active pages. If Entry-n specifies an inactive page (i.e. AFn [1:0] set to 2'b00) the higher numbered entries are considered inactive.

While there is a high degree of freedom in how these registers can be programmed, system software is expected to program and manage the registers in an optimal way for memory management performance. If software were to program the Entry-0 of each PSCR register with the 2'b00 encoding in the AF0 field, this would result in an effective bypass of the UTB, forcing requests to initiate a table walk, none of which would allocate entries in the UTB.

According to embodiment of the present disclosure, the PSCR registers are system level registers. In a virtualized environment, the TB0PSCR_EL1 and TB1PSCR_EL1 registers are accessible to both EL1 and EL2 privilege levels. In fact, EL2 may manage these registers similarly to how it would manage the respective base table registers (TTBR0_EL1 and TTBR1_EL1) when swapping context of one virtual machine with another. Further, support may be provided to allow EL2 to disable EL1 access to the TB0PSCR_EL1 and TB1PSCR_EL1 registers similar to the TTBRs. Presumably, the same bits in the architecture that control access to TTBR0_EL1 and TTBR1_EL1 will affect the corresponding PSCR registers in a similar manner.

FIG. 5e illustrates exemplary reset and initialization values for page sequence control registers according to some aspects of the present disclosure. The PSCR registers are initialized on hardware reset. FIG. 5e describes in detail the values loaded into the PSn[2:0] and AFn[1:0] fields for n=0 through n=5 when hardware reset is asserted. Note that the initialization values will guarantee correct operation with no further programming of the registers. Performance may not be optimal, but should be reasonable. It is recommended that system software programs and manages the registers as part of the memory management system.

Stage-2 translation requests are issue by the TWS whenever an IPA to PA lookup is required. This type of request may occur if virtualization is enabled and while TWS is doing a table walk. The RLS handles this request slightly different than processor core requests, i.e. requests that are issued by ICF and LSU. A Stage-2 request implies that the MMU is already servicing a processor core request, hence arbitration is limited to selecting between the Stage-2 request and a TMO request. When the RLS completes a Stage-2 lookup in the UTB, it returns a response to the TWS. If a parity error is detected, the RLS will signal the error with the response. TWS interprets the parity error as a UTB miss and continues to the next step of the table walk.

According to embodiments of the present disclosure, UTB allocate and write requests are issued by the TWS in two cases:
During a table walk, when allocating a new IPA to PA mapping for a Stage-2 translation that missed in the UTB.
At the end of a table walk, when allocating a new VA to PA mapping.
In both cases, TWS issues an allocate and write request to RLS. RLS handles this type of request differently than normal lookup requests:
A single lookup access is initiated to read out the Used bit vector. One TagRam macro needs to be read for this.
The Used bit vector is examined together with the global replacement pointer to determine which way is to be written to.
RLS then initiates a write access cycle and writes the new entry (data is supplied by TWS) together with an update of the used bit vector.
In essence, RLS executes an atomic read-modify-write transaction to the UTB. Once the write is done, RLS issues a special result response to TWS to indicate that the operation is completed.

TMO requests to RLS include various flavors of TLB invalidation commands. These invalidation requests have the highest priority within the MMU. Once a TMO request wins arbitration, RLS processes the TLB invalidation. Based on the type of operation, the RLS does the appropriate lookup and invalidation. Each type of TLB invalidation clearly defines what is required. Once a TLB invalidation request wins arbitration, it is guaranteed to be executed atomically, i.e. no other request can get access to the UTB while the invalidation is in progress. In one implementation, a TMO invalidation request can be broken down into sub-requests to the RLS. These may be guaranteed to be executed as one atomic unit, i.e. other requests to the RLS will be locked out of arbitration, until the sequence of TMO sub-requests is complete.

These types of lookups differ from normal lookups in the sense that they may not cause a table walk miss request to be issued to the TWS. The operations require is lookup access to the UTB and write access to the UTB entry valid and used bits. When RLS processes a TMO request, it may also issue an invalidate command to the ITB/DTB. This would be based on the type of operation as well as the DTB/ITB directory data. In addition, RLS will also issue an invalidate command to the PWC. The type of invalidate depends on the type of TMO operation.

The VA to PA instructions is issued to the MMU via the Load pipeline. The instruction type is encoded via the Load Request Type on the LSU-MMU interface. The MMU will process the instruction based on its type and then will update the PAR accordingly. Updates to the PAR occur if no external abort is detected during the processing of the instruction.

These instructions require recording translation information in the PAR. Since the MMU may not keep the necessary information in the UTB to service the request, RLS will issue a table walk request to TWS. The TWS processes the instruction appropriately, updates the PAR, but does not allocate/update the UTB. Inhibiting the allocation/update of the UTB of Stage-1 and Stage-2 table walk results is done for reasons of design simplicity and not based on architectural considerations. It is not obvious what the desirable behavior should be in this case. Note that allocations/updates to the PWC happen normally. Lookups in the UTB for a Stage-2 request or lookups in the PWC (Stage-1 or Stage-2) can hit and use the results for the purpose of doing the table walk and updating the PAR. In these cases, if a hit occurs, the MRU bits are updated.

If no external abort is detected, a result response is returned to the LSU on the result interface, otherwise the MMU will signal an exception condition on the result interface. The LSU may update the DTB with the result of the AT instructions. As part of the processing of these instructions, the MMU does necessary permission checks and extraction of memory region attributes. Note that the MMU does not maintain a speculative copy of the PAR. Updates to the PAR are done to the architectural version. This implies that the core may treat VA to PA instructions (also referred to as AT instructions) as non-speculative.

The MMU provides decisions as to which L1 TLB entries may be invalidated in a given situation. The L1 TLBs are not maintained as a subset of the L2 TLB. This means that an entry can be cached in the DTB and/or ITB, but may not be cached in the UTB.

DTB/ITB invalidations can occur as a result of TLB maintenance instructions or other architectural state changes that may make the current cached translations in the ITB/DTB invalid. These architectural state changes are a result of doing SPR register writes that affect internal MMU state used to do translations.

The MMU maintains directories for the DTB and ITB so that some amount of filtering can be done with respect to invalidations. The directories include the following information for each entry within the DTB and ITB:
- H bit—Hypervisor-EL2 mapping. This indicates whether the page is an EL2 mapping or EL0/EL1 mapping.
- G bit—Global mapping. This indicates whether the page is global or non-global.

In one implementation, the combinations for the H and G bits may be used to describe the following types of mapping. For {H, G}=2'b00, the type of mapping is EL0/EL1 and non-global page; for {H, G}=2'b01, the type of mapping is EL0/EL1 and global page; for {H, G}=2'b1x, the type of mapping is EL2 mapping, and no global vs. non-global page.

The MMU uses the mapping described above to determine when an invalidation operation it is performing needs to be reflected upwards to one or both of the L1 TLBs. In addition to looking up an invalidation operation in the UTB, that operation is also looked up against the directories for the DTB and ITB. In one approach, the invalidation is filtered to the L1-TLBs based on the type of invalidation.

FIG. 6 illustrates exemplary level 1 table commands and their corresponding directory actions according to some aspects of the present disclosure. As shown in FIG. 6, it describes how L1-TLB invalidations are filtered based on the type of invalidation and the content of the directories. References to EU in the table mean entries that include either Stage-1, or a combination of Stage-1 and Stage-2 information. Depending on the translation mode, the L1TLBs may include either type, but may not be both.

As described above, there are other types of operations that may cause ITB/DTB invalidation commands to be issued by the MMU. FIG. 7 describes the various SPR writes and state changes that affect the ITB and/or DTB in terms of invalidation actions. FIG. 7 illustrates exemplary special purpose register writes and their corresponding directory action according to some aspects of the present disclosure. The MMU tracks the DTB/ITB entries by receiving an indication on the LSU-MMU and ICF-MMU interfaces that tells it which way is being allocated.

A flash invalidation of a selected set of entries in the L1-TLB is identified by a 20-bit vector (supplied by the MMU) where each bit corresponds to an entry in the L1-TLB (entries [19:0]). An invalidation operation is performed with the same timing (relative to surrounding lookup operations) as a write operation. Based on the received 20-bit vector, one, multiple, or all entries may be simultaneously invalidated. This bit-vector is supplied by the MMU in conjunction with it's invalidate command to the DTB or ITB. The MMU ensures that an invalidation operation and a write operation to a given L1 TLB may not be simultaneously performed. The L1 TLB macro may perform either a normal write or an "invalidation write" during a given cycle.

Note that to avoid unwanted propagation of x's (in simulation) for the case where invalidation commands are used before the entries of the L1-TLBs have been initialized, the MMU initializes the directories to 2'b00 (EL0/EL1 and non-global) upon receiving a CacheInit from the Reset/Initialization controller.

According to embodiments of the present disclosure, the number of memory references required to process a two dimensional (Stage-1 and Stage-2) table walk can become costly from a performance penalty perspective. A common technique used to mitigate this penalty is the use of a Page Walk Cache. The MMU caches the most recently used MPTEs from different levels of the page tables in its Page Walk Cache (PWC). Note that the cached MPTE is not a copy of a PTE in memory. It is a "Modified PTE" (MPTE) corresponding to the particular level that is cached. The MPTE reflects the combined effects of doing a table walk to reach the corresponding level that was cached in the PWC.

When RLS services a UTB lookup request, it also initiates a corresponding lookup request to the PWC. If the UTB lookup hits, the PWC is ignored and its results are discarded. If the UTB misses and a table walk is required, then TWS will look at the results of the PWC lookup to determine if can reduce the number of steps required to complete the table walk. When processing a TMO operation, RLS will also initiate an invalidation request to the PWC. This is done towards the end of processing a TMO operation. If a table walk is in progress while a TMO operation is being processed, the MMU will inhibit updates of the PWC for the table walk in question. This is to avoid having stale data cached in the PWC.

Figure 8:
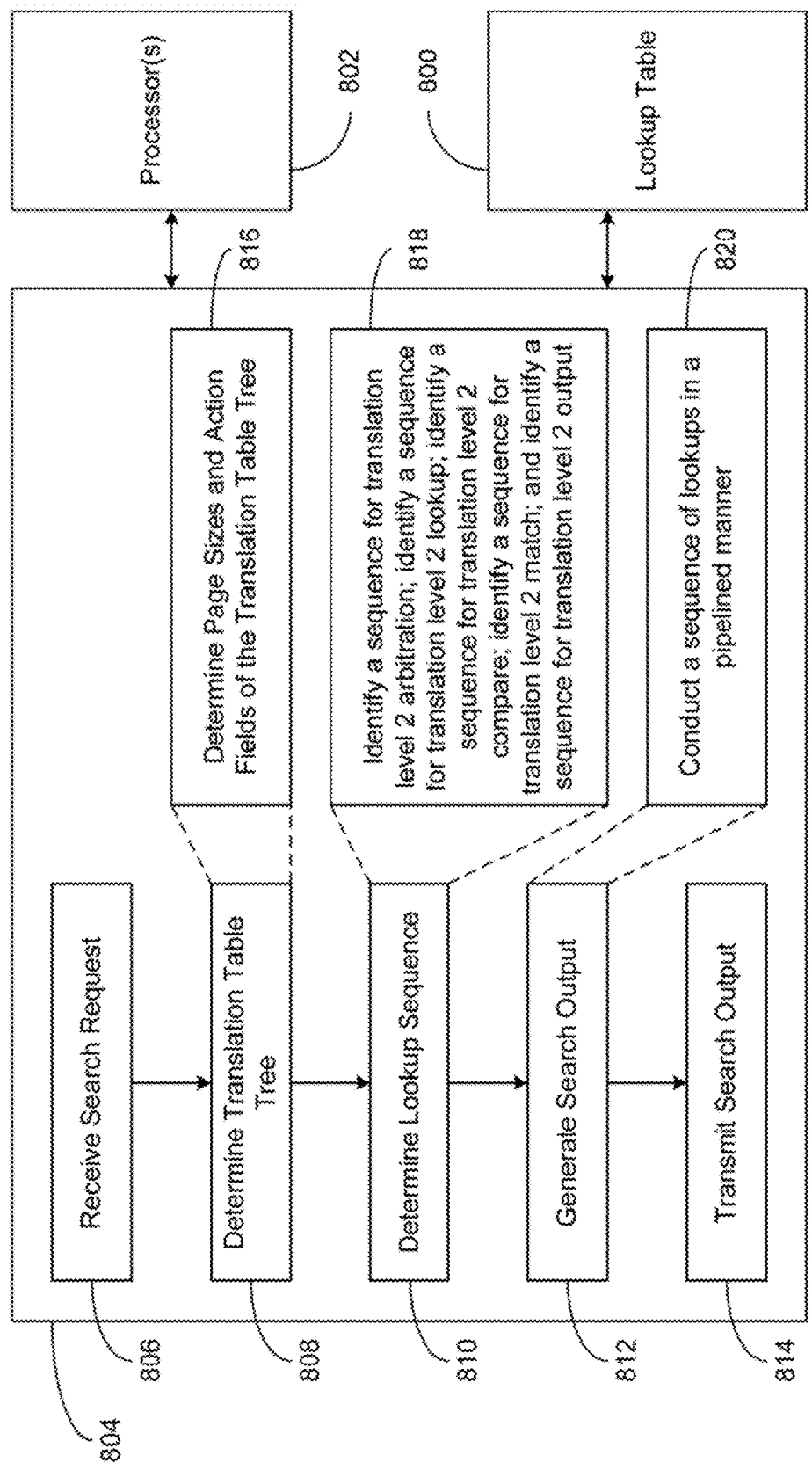
FIG. 8 illustrates an exemplary flow chart implemented a memory management apparatus according to some aspects of the present disclosure.

FIG. 8 illustrates an exemplary flow chart implemented a memory management apparatus according to some aspects of the present disclosure. As shown in FIG. 8, the memory management apparatus includes a lookup table 800, one or more processors 802 and a memory management controller 804 configured to work with the one or more processors 802 and the lookup table 800. The lookup table includes a plurality of translation modes and wherein each translation mode includes a corresponding translation table tree supporting a plurality of page sizes. The plurality of translation modes includes a first set of page sizes for 32-bit operating system software and a second set of page sizes for 64-bit operating system software. The plurality of page sizes includes non-global pages, global pages, and both non-global and global pages. The translation table tree includes at least one of Hypervisor Stage-1 translation table tree, Hypervisor Stage-2 translation table tree, non-Hypervisor Stage-1 kernel translation table tree, and non-Hypervisor Stage-1 user translation table tree.

In block 806, the memory management controller is configured to receive a search request from a requester. In block 808, the memory management controller is configured to determine a translation table tree for conducting the search request. In block 810, memory management controller is configured to determine a lookup sequence based on the translation table tree. In block 812, the memory management controller is configured to generate a search output using the lookup sequence. In block 814, the memory management controller is configured to transmit the search output to the requester.

According to embodiments of the present disclosure, block 808 may be implemented at least in part by block 816. In block 816, the memory management controller is configured to determine a set of preprogrammed page sizes and action fields of the translation table tree to be followed in conducting the search request. Moreover, block 810 may be implemented at least in part by block 818. In block 818, the memory management controller is configured to identify a sequence for translation level 2 arbitration, identify a sequence for translation level 2 lookup, identify a sequence for translation level 2 compare, identify a sequence for translation level 2 match, and identify a sequence for translation level 2 output. Furthermore, block 812 may be implemented at least in part by block 820. In block 820, the memory management controller is configured to conduct a sequence of lookups according to a predetermined page size in a pipelined manner. The search output includes at least one of a most recently used virtual address to physical address translation, a most recently used intermediate address to physical address translation, and a most recently used physical address to physical address translation.

It will be appreciated that the above description for clarity has described embodiments of the disclosure with reference to different functional units and processors. However, it will be apparent that any suitable distribution of functionality between different functional units or processors may be used without detracting from the disclosure. For example, functionality illustrated to be performed by separate processors or controllers may be performed by the same processors or controllers. Hence, references to specific functional units are to be seen as references to suitable means for providing the described functionality rather than indicative of a strict logical or physical structure or organization.

The disclosure can be implemented in any suitable form, including hardware, software, firmware, or any combination of these. The disclosure may optionally be implemented partly as computer software running on one or more data processors and/or digital signal processors. The elements and components of an embodiment of the disclosure may be physically, functionally, and logically implemented in any suitable way. Indeed, the functionality may be implemented in a single unit, in a plurality of units, or as part of other functional units. As such, the disclosure may be implemented in a single unit or may be physically and functionally distributed between different units and processors.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

What is claimed is:

1. A method of performing a table lookup, comprising:
providing a lookup table, wherein the lookup table comprises a plurality of translation modes and wherein each translation mode comprises a corresponding translation table tree supporting a plurality of page sizes, wherein a first set of page sizes of the plurality of page sizes correspond to a 32 bit operating system software, and a second set of page sizes of the plurality of pages sizes correspond to a 64 bit operating system software;
receiving a search request from a requester;
determining a translation table tree for conducting the search request comprising determining a set of hashing functions that correspond to a set of preprogrammed page sizes and lookup types to be followed in executing the search request, wherein the lookup types correspond to a type of memory address;
determining a lookup sequence based on a function of the page sizes and lookup types, wherein the function is defined by a page sequence control register corresponding to a translation mode of the plurality of translation modes;
generating a search output using the lookup sequence; and
transmitting the search output to the requester.

2. The method of claim 1, wherein the plurality of page sizes comprises at least one of a non-global page or a global page, or a combination thereof.

3. The method of claim 1, wherein the translation table tree comprises at least one of a Hypervisor Stage-1 translation table tree, a Hypervisor Stage-2 translation table tree, a non-Hypervisor Stage-1 kernel translation table tree, and a non-Hypervisor Stage-1 user translation table tree.

4. The method of claim 1, wherein determining a translation table tree comprises:
determining the set of preprogrammed page sizes and lookup types of the translation table tree based on encoded bits in the search request.

5. The method of claim 1, wherein determining a lookup sequence comprises:
identifying a sequence for translation level 2 arbitration;
identifying a sequence for translation level 2 lookup;
identifying a sequence for translation level 2 compare;
identifying a sequence for translation level 2 match; and
identifying a sequence for translation level 2 output.

6. The method of claim 1, wherein generating a search output using the lookup sequence comprises:
conducting a sequence of lookups based on a sequence of predetermined page sizes in a pipelined manner.

7. The method of claim 6, wherein in response to determining a match made in a lookup of the sequence of lookups, discarding and ceasing other lookups of the sequence of lookups.

8. The method of claim 1, wherein the search output comprises at least one of:
a most recently used virtual address to physical address translation;
a most recently used intermediate address to physical address translation; and
a most recently used physical address to physical address translation.

9. A computer program product for performing table lookup, comprising a non-transitory medium storing computer programs for execution by one or more computer systems, comprising:
code for providing a lookup table, wherein the lookup table comprises a plurality of translation modes and wherein each translation mode comprises a corresponding translation table tree supporting a plurality of page sizes, wherein a first set of page sizes of the plurality of page sizes correspond to a 32 bit operating system software, and a second set of page sizes of the plurality of pages sizes correspond to a 64 bit operating system software;
code for receiving a search request from a requester;
code for determining a translation table tree for conducting the search request comprising code for determining a set of hashing functions that correspond to a set of preprogrammed page sizes and lookup types be followed in executing the search request, wherein the lookup types correspond to a type of memory address;
code for determining a lookup sequence based on a function of the page sizes and lookup types, wherein the function is defined by a page sequence control register corresponding to a translation mode of the plurality of translation modes;
code for generating a search output using the lookup sequence; and
code for transmitting the search output to the requester.

10. The computer program product of claim 9, wherein the plurality of page sizes comprises at least one of a non-global page or a global page, or a combination thereof.

11. The computer program product of claim 9, wherein the translation table tree comprises at least one of a Hypervisor Stage-I translation table tree, a Hypervisor Stage-2 translation table tree, a non-Hypervisor Stage-I kernel translation table tree, and a non-Hypervisor Stage-I user translation table tree.

12. The computer program product of claim 9, wherein the code for determining the set of pre programmed page sizes and lookup types of the translation table tree is based on encoded bits in the search request.

13. The computer program product of claim 9, wherein code for determining a lookup sequence comprises:
   code for identifying a sequence for translation level 2 arbitration;
   code for identifying a sequence for translation level 2 lookup;
   code for identifying a sequence for translation level 2 compare;
   code for identifying a sequence for translation level 2 match; and
   code for identifying a sequence for translation level 2 output.

14. The computer program product of claim 9, wherein code for generating a search output using the lookup sequence comprises:
   code for conducting a sequence of lookups based on a sequence of predetermined page sizes in a pipe lined manner.

15. The computer program product of claim 14, wherein the code for conducting the sequence of lookups further comprises code for discarding other lookups of the sequence of lookups in response to determining a match made in a lookup of the sequence of lookups.

16. The computer program product of claim 9, wherein the search output comprises at least one of:
   a most recently used virtual address to physical address translation;
   a most recently used intermediate address to physical address translation; and
   a most recently used physical address to physical address translation.

17. A memory management apparatus, comprising: a lookup table, wherein the lookup table comprises a plurality of translation modes and wherein each translation mode comprises a corresponding translation table tree supporting a plurality of page sizes, wherein a first set of page sizes of the plurality of page sizes correspond to a 32 bit operating system software, and a second set of page sizes of the plurality of pages sizes correspond to a 64 bit operating system software; one or more processors;
   a memory management controller configured to work with the one or more processors, wherein the memory management controller comprises:
      logic configured to receive a search request from a requester;
      logic configured to determine a translation table tree for conducting the search request comprising logic for determining a set of hashing functions that correspond to a set of preprogrammed page sizes and lookup types to be followed in executing the search request, wherein the lookup types correspond to a type of memory address;
      logic configured to determine a lookup sequence based on a function of the page sizes and lookup types, wherein the function is defined by a page sequence control register corresponding to a translation mode of the plurality of translation modes;
      logic configured to generate a search output using the lookup sequence; and
      logic configured to transmit the search output to the requester.

18. The memory management apparatus of claim 17, wherein the plurality of page sizes comprises at least one of a non-global page or a global page, or a combination thereof.

19. The memory management apparatus of claim 17, wherein the translation table tree comprises at least one of a Hypervisor Stage-I translation table tree, a Hypervisor Stage-2 translation table tree, a non-Hypervisor Stage-I kernel translation table tree, and a non-Hypervisor Stage-I user translation table tree.

20. The memory management apparatus of claim 17, wherein logic configured to determine the set of pre programmed page sizes and lookup types of the translation table tree is based on encoded bits in the search request.

21. The memory management apparatus of claim 17, wherein logic configured to determine a lookup sequence comprises:
   logic configured to identify a sequence for translation level 2 arbitration;
   logic configured to identify a sequence for translation level 2 lookup;
   logic configured to identify a sequence for translation level 2 compare;
   logic configured to identify a sequence for translation level 2 match; and
   logic configured to identify a sequence for translation level 2 output.

22. The memory management apparatus of claim 17, wherein logic configured to generate a search output using the lookup sequence comprises:
   logic configured to conduct a sequence of lookups based on a sequence of predetermined page size in a pipe lined manner.

23. The memory management apparatus of claim 22, wherein the logic configured to conduct the sequence of lookups further comprises logic configured to discard other lookups of the sequence of lookups in response to determining a match made in a lookup of the sequence of lookups.

24. The memory management apparatus of claim 17, wherein the search output comprises at least one of:
   a most recently used virtual address to physical address translation;
   a most recently used intermediate address to physical address translation; and
   a most recently used physical address to physical address translation.

* * * * *